Patented Jan. 7, 1941

2,228,166

UNITED STATES PATENT OFFICE

2,228,166

BASIC DOUBLE ETHERS OF QUINOLINE SERIES AND A PROCESS OF PREPARING THEM

Heinrich Jensch, Frankfort-on-the-Main, Germany, assignor to Winthrop Chemical Company, Inc., New York, N. Y., a corporation of New York No Drawing. Application July 27, 1939, Serial No. 286,878. In Germany July 30, 1938

4 Claims. (Cl. 260—288)

The present invention relates to basic double ethers of the quinoline series and to a process of preparing them.

In U. S. Patents Nos. 2,034,983, 2,092,352 and 2,050,971 there are described derivatives of 4.6-diamino-quinolines among which especially those are of practical value (cf. "Angewandte Chemie," vol. 50, page 891) wherein two molecules of the diamines are connected by the 6-amino-group so as to form a double molecule.

Now, I have found that also 4-amino-6-hydroxy-quinolines or 4-amino-8-hydroxyquinolines linked to form a double molecule of the nature of a bis-ether yield valuable chemotherapeutic compounds which are particularly effective against parasites of the blood. These hitherto unknown compounds are obtainable by the methods usual for the manufacture of double ethers of phenols, for instance, by the action of epihalogenhydrines, methylene halides or polymethylene halides, which may contain substituents and the carbon chains of which may be interrupted by other atoms (for instance, sulfur) or by cyclic connecting members, on primary, secondary or tertiary 4-amino-quinolines containing in the benzene nucleus in 6- or 8-position a hydroxyl group or also on such 6- or 8-hydroxy-quinolines as allow the subsequent introduction of a primary, secondary or tertiary amino-group into the 4-position. In some cases the chemotherapeutical effect may be enhanced by transforming the nuclear nitrogen atoms into the quaternary state. The compounds obtainable by this method correspond with the general formula:

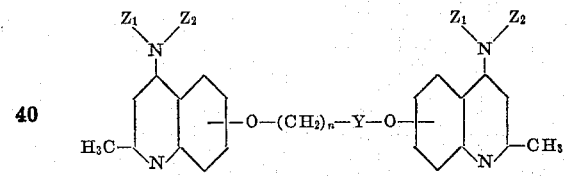

wherein $n$ stands for a whole number from 1 to 5, $Z_1$ and $Z_2$ stand for hydrogen or alkyl and $Y$ stands for naught or for the radical $$-X.(CH_2)_n-$$

wherein X stands for S, O or CHOH.

The following examples serve to illustrate the invention but they are not intended to limit it thereto:

(1) *Bis-(2-methyl-4-amino-quinolyl-6)-methylene ether*

A solution of 21 grams of 4-amino-6-hydroxy-quinaldine (obtainable for instance from the 6-ethoxy compound by boiling together with hydrobromic acid of 48 per cent strength; it crystallizes from water in the form of long fine needles; in the anhydrous state it forms at 138° C.–140° C. a porous melt) in about 100 cc. of an alcoholic solution of sodium ethylate made from 2.7 grams of sodium, is heated after addition of 5.4 grams of methylene chloride and a small quantity of copper powder in a bomb tube for about 15 hours at 120° C. The alcohol is then eliminated from the contents of the bomb, the residue is stirred together with dilute caustic soda solution, filtered with suction and washed with water. The new base, the bis-(2-methyl-4-amino-quinolyl-6)-methylene ether, forms, when recrystallized from dilute alcohol, a fine, crystalline light-grey powder which dissolves easily in methanol and forms at 173 C.–174° C. a dark viscous melt. On addition of ether to the alcoholic solution acidified by means of glacial acetic acid the acetate is precipitated in the form of a resin which solidifies on kneading with ethyl acetate and cooling. It forms a heavy grey powder which dissolves easily in cold water to a feebly alkaline solution. An excess of hydrochloric acid precipitates from the solution the hydrochloride in the form of a jelly.

(2) *Bis-(2-methyl-4-amino-quinolyl-6)-ethylene ether*

A solution prepared as described in Example 1 from 21 grams of 4-amino-6-hydroxy-quinaldine is boiled in a reflux apparatus for 12 hours after addition of 11.4 grams of ethylene bromide. After elimination of the alcohol the residue is dissolved in hot dilute acetic acid and the solution is treated with an excess of dilute hydrochloric acid. After cooling, the precipitated hydrochloride of the bis-(2-methyl-4-amino-quinolyl-6)-ethylene ether is filtered with suction and washed with dilute hydrochloric acid and acetone. When heated in water it dissolves to a viscid solution. The base precipitated from the solution with the aid of caustic soda solution forms after recrystallization from alcohol and a small quantity of water a colorless powder which melts and darkens at 273° C.–274° C.

(3) *Bis-(2-methyl-4-amino-quinolyl-6)-trimethylene ether*

A solution of 19.5 grams of 4-amino-6-hydroxy-quinaldine in 100 cc. of alcohol containing 2.4 grams of sodium as alcoholate is mixed with 10.5 grams of trimethylene-bromide and a trace of copper powder and the mixture is then heated to boiling for about 15 hours. The new base formed, the bis-(2-methyl-4-amino-quinolyl-6)-trimethylene ether separates in part already while hot. After addition of water the ether is filtered with suction and washed with dilute caustic soda solution and water. It forms when recrystallized from methanol and water a fine colorless powder which blackens and melts at 298° C. If the base is dissolved in methanol by feebly acidifying with glacial acetic acid and acetone is added to the solution, the colorless finely crystalline acetate separates; this dissolves in water to a yellow solution. Hydrochloric acid in excess forms in the solution a jelly.

(4) α-γ-bis-(2-methyl-4-amino-quinolyl-6)-glycerol ether 76 grams of 4-amino-6-hydroxy-quinaldine are well stirred with 300 cc. of alcohol which have been caused to react with 4.8 grams of sodium. After addition of 18 grams of epichlorhydrin the whole is heated to boiling for 4 hours and the alcohol is then removed. The residue is dissolved in hot dilute acetic acid, the boiling solution is treated with dilute hydrochloric acid in excess and the separated colorless hydrochloride of the α-γ-bis-(2-methyl-4-amino-quinolyl-6)-glycerol ether is filtered with suction after cooling and washed with dilute hydrochloric acid. It may be recrystallized from glacial acetic acid which has been mixed with a small quantity of water. It contains 2 mols of HCl and 2 mols of water of crystallization. The base may be recrystallized from methanol and water in the form of a nearly colorless crystalline powder which blackens and melts at 290° C. The easily soluble acetate is obtained in the manner described in Example 3 in the form of a grey sandy powder.

(5) α-γ-bis-(2-methyl-4-ethylamino-quinolyl-6)-glycerol ether

The 4-ethylamino-6-hydroxy-quinaldine may be obtained, for instance, from the 6-ethoxy-compound by boiling with hydrobromic acid of 48 per cent strength. It melts when recrystallized from water at 145° C.–146° C. while foaming. 22 grams of this compound are stirred together with 60 cc. of an alcoholic sodium alcoholate solution from 1.2 grams of sodium. After addition of 4.6 grams of epichlorhydrin the whole is boiled for 4 hours in a reflux apparatus. The mass is dissolved by addition of dilute acetic acid while hot and the warm solution is treated with dilute hydrochloric acid in excess. The colorless hydrochloride of α-γ-bis-(2-methyl-4-ethylamino-quinolyl-6)-glycerol ether thus precipitated is dissolved in water and the base separated while hot by addition of caustic soda solution. The base is dissolved in methanol with addition of glacial acetic acid. The hydrochloride is precipitated from this solution by means of acetone in the form of an almost colorless powder. It dissolves easily in water. The base precipitated from this solution with the aid of ammonia is a yellowish powder which dissolves easily in methanol and melts and darkens at about 190° C.

(6) α-γ-bis-(2-methyl-4-dimethylamino-quinolyl-6)-glycerol ether

As indicated in Example 5, the 4-dimethylamino-6-ethoxy-quinaldine yields the 4-dimethylamino-6-hydroxy-quinaldine in the form of a yellowish powder which melts after recrystallization from water at 278° C.–279° C. If 22 grams of this compound are worked up precisely as described in the last preceding example there is obtained the colorless hydrochloride of the α-γ-bis-(2-methyl-4-dimethylamino-quinolyl-6)-glycerol ether. When the solution of the base in methanol is acidified with glacial acetic acid and ether is added the acetate is precipitated in the form of a resin, which on kneading with acetone is transformed into a grey powder. It dissolves easily in water. The base precipitated by means of caustic soda solution decomposes at 170° C. while swelling to a porous melt. It dissolves easily in methanol.

(7) β-β'-bis-(2-methyl-4-amino-quinolyl-6-hydroxy)-diethyl sulfide 38 grams of 4-amino-6-hydroxy-quinaldine are dissolved in an alcoholic sodium alcoholate solution from 2.4 grams of sodium. Thereupon the solution is heated to boiling for 6 to 7 hours after addition of 16 grams of β-β'-dichloro-diethyl-sulfide. A thick magma is formed which is filtered with suction and washed with alcohol. After drying it forms a light-grey powder and consists of β-β'-bis-(2-methyl-4-amino-quinolyl-6-hydroxy)-diethyl sulfide. When recrystallized from pyridine it is a colorless powder which melts at 250° C.–251° C. while darkening and previously sintering. The acetate prepared as described in the preceding examples is colorless and dissolves easily in hot water. The solutions are disposed to form jellies in the cold.

(8) N.N'-bis[2-methyl-4-aminoquinolyl-(6)-hydroxyethyl]-piperazine

A solution of 29 grams of 4-amino-6-hydroxy-quinaldine in 150 cc. of ethanol containing 3.3 grams of sodium as alcoholate is mixed with 15.2 grams of N.N'-dichloro-diethylpiperazine (which is obtained in the form of a colorless crystalline mass from the corresponding di-hydroxyethyl-piperazine by boiling with thionyl chloride) and the mixture is boiled for 6 hours in a reflux apparatus. After cooling, the precipitate formed is filtered with suction together with the separated sodium chloride, washed with alcohol and dissolved in hot dilute acetic acid. On addition of caustic soda solution the solution which has been filtered separates the new base having the above-named composition. When recrystallized from a large quantity of pyridine the product forms a colorless, very fine crystalline powder melting, while darkening, at 282° C.–283° C. From its solution in dilute hydrochloric acid there precipitates, on addition of hydrochloric acid in excess, a colorless hydrochloride which is rather easily soluble in water.

(9) Di-[2-methyl-4-amino-quinolyl-(6)-hydroxy]-diethylether 39 grams of 4-chloro-6-hydroxy-quinaldine (which may, for instance, be prepared from 4-chloro-6-ethoxy-quinaldine in a manner analogous to that for the preparation of the 4-amino-compound; it melts at 223° C.–224° C. while decomposing and assuming a dark violet coloration) are dissolved in 200 cc. of an alcoholic sodium ethylate solution from 4.6 grams of sodium. After addition of 14.5 grams of dichlorodiethyl ether and a trace of copper powder the solution is heated to 90° C.–100° C., in a bomb, for 24 hours. After cooling the colorless crystalline di-[2-methyl-4-chloroquinolyl-(6)-hydroxy]-diethylether, which has separated, is filtered with suction and washed with alcohol. When recrystallized from alcohol and chloroform the product melts at 186° C. 25 grams of this product are dissolved in 75 grams of phenol whereupon this solution is slowly heated to 180° C., ammonia being continually passed through the solution, and this temperature is maintained for about 2 hours. If the cooled mass is then stirred into caustic soda solution, the di-[2-methyl-4-aminoquinolyl-(6)-hydroxy]-diethylether separates. After recrystallization from alcohol and water, the product is obtained in a granular-crystalline form, and melts at 233° C.–234° C. The acetic acid salt obtained which has a grey coloration yields in water viscid solutions.

(10) α,γ-bis-(2-methyl-4-amino-quinolyl-6)-glycerol ether 29 grams of 4-chloro-6-hydroxy-quinaldine are stirred together with 200 cc. of an alcoholic sodium ethylate solution from 1.8 grams of sodium. The whole is then heated to boiling after addition of 7 grams of epichlorhydrin. After a short time dissolution occurs and later precipitation. After 4 to 5 hours, water and caustic soda solution are added, the precipitate is filtered with suction, washed with a small quantity of alcohol and then with water. The crystalline powder thus obtained, the α-γ-bis-(2-methyl-4-chloro-quinolyl-6)-glycerol ether is insoluble in dilute acetic acid, soluble however in dilute hydrochloric acid. Recrystallized from chloroform and alcohol it forms a very fine colorless powder, melting at 208° C.–209° C. 26.5 grams of this compound are caused to react with ammonia as described in the foregoing example.

If the mass is then stirred into caustic soda solution, the α-γ-bis-(2-methyl-4-amino-quinolyl-6)-glycerol ether separates in the form of a light-grey powder. It is identical with the compound described in Example 4.

(11) Bis-(2-methyl-4-amino-quinolyl-6)-pentamethylene ether 29 grams of 4-chloro-6-hydroxy-quinaldine (see Example 9) are dissolved in about 150 cc. of an alcoholic sodium ethylate solution from 3.5 grams of sodium whereupon the solution is heated to boiling for 20 hours after addition of 17.3 grams of pentamethylene-dibromide and a trace of copper powder. On cooling a thick magma is obtained which is filtered with suction and washed with alcohol and water. The bis-(2-methyl-4-chloro-quinolyl-6)-pentamethylene ether which melts at 148° C. when recrystallized from alcohol, is transformed precisely as described in Example 9 into the bis-(2-methyl-4-amino-quinolyl-6)-pentamethylene ether. After recrystallization from a mixture of methanol and ethanol the ether is a fine, nearly colorless powder forming at 275° C. a dark melt. It may be transformed into the acetate in the manner described in the preceding examples. The acetate is a crystalline grey powder and yields in water viscid feebly yellowish solutions.

(12) α,γ-bis-(2-methyl-4-amino-quinolyl-8)-glycerol ether 9.6 grams of 4-chloro-8-hydroxy-quinaldine (prepared in a manner analogous to that of the 6-hydroxy compound from 4-chloro-8-methoxy-quinaldine by boiling with hydrobromic acid of 48 per cent strength; when recrystallized from petroleum ether it forms long fine needles, melting at 65° C.–66° C.) dissolved in 25 cc. of an alcoholic sodium alcoholate solution from 0.6 gram of sodium are boiled for 4 hours in a reflux apparatus after addition of 2.3 grams of epichlorhydrin. From the deeply violet colored solution there separates on cooling the α-γ-bis-(2-methyl-4-chloro-quinolyl-8)-glycerol ether which is filtered with suction and washed with water. It is insoluble in dilute acetic acid, soluble in hot dilute hydrochloric acid and decomposes, when recrystallized from a large quantity of alcohol, at 198° C. while assuming a dark violet coloration. If it is treated as described in Example 9 with ammonia in phenol the α-γ-bis-(2-methyl-4-amino-quinolyl-8)-glycerol ether is formed. The latter is, when recrystallized from alcohol a fine colorless crystalline powder which at 115° C. parts with water of crystallization and melts after dehydration at 249° C.–250° C. while assuming a brown coloration. It dissolves easily in cold dilute acetic acid; on addition of hot dilute hydrochloric acid, the flaky colorless hydrochloride is precipitated from the solution.

(13) Bis-(2-methyl-4-amino-quinolyl-6)-ethylene ether-bis-methochloride 13.8 grams of the base described in Example 2 are heated in 75 cc. of methanol with addition of 4.8 cc. of methyl iodide for 3 hours at 115° C. After elimination of the methanol the residue is treated while stirring and heating on a water bath for 3 hours with an aqueous suspension of freshly precipitated silver chloride, thereupon filtered with suction while hot and the filtrate mixed with hot dilute hydrochloric acid until the salting out begins. After cooling the bis-(2-methyl-4-amino-quinolyl-6)-ethylene ether-bis-methochloride is filtered with suction and washed with dilute hydrochloric acid and acetone. It forms a colorless powder which is easily soluble in hot water and moderately soluble in cold water, and may be recrystallized from methanol whereupon it melts at 308° C.–310° C. while foaming. The hot aqueous solution is not precipitated by ammonia whereas caustic soda solution yields a resinous precipitate which becomes solid on boiling and is rather easily soluble in hot water to a solution feebly alkaline to phenol-phthalein. Recrystallized from alcohol it forms an indistinctly crystalline powder which sinters at 140° C. while assuming a brown coloration and decomposes at 170° C. while swelling to a porous melt.

I claim:
1. The compounds of the following general formula:

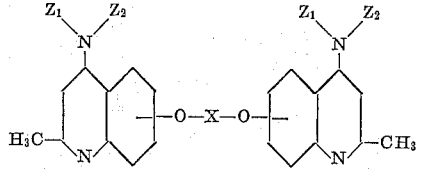

wherein X stands for a member of the group consisting of $(CH_2)_n$ and $(CH_2)_n-Y-(CH_2)_n$, in which $n$ represents a whole number from 1 to 5, Y is a member of the group consisting of S, O and CHOH, and $Z_1$ and $Z_2$ stand for members of the group consisting of hydrogen and alkyl radicals, said compounds forming with acetic acid readily soluble salts, gelatinizing on addition of a dilute hydrochloric acid.

2. As a new compound the bis-(2-methyl-4-aminoquinolyl-6)-ethylene ether.

3. As a new compound the bis-(2-methyl-4-amino-quinolyl-6)-trimethylene ether.

4. As a new compound the α-γ-bis-(2-methyl-4-ethylamino-quinolyl-6)-glycerol ether.

HEINRICH JENSCH.